(12) United States Patent
Abe et al.

(10) Patent No.: US 7,720,235 B2
(45) Date of Patent: May 18, 2010

(54) SIGNAL PROCESSING METHOD AND APPARATUS, SIGNAL PROCESSING PROGRAM, AND RECORDING MEDIUM

(75) Inventors: Mototsugu Abe, Tokyo (JP); Masayuki Nishiguchi, Kanagawa (JP)

(73) Assignee: Sony Corporation, Tokyo (JP)

( * ) Notice: Subject to any disclaimer, the term of this patent is extended or adjusted under 35 U.S.C. 154(b) by 812 days.

(21) Appl. No.: 10/273,529

(22) Filed: Oct. 18, 2002

(65) Prior Publication Data

US 2003/0125823 A1 Jul. 3, 2003

(30) Foreign Application Priority Data

Oct. 22, 2001 (JP) ............................. 2001-324254

(51) Int. Cl.
*H04B 15/00* (2006.01)
(52) U.S. Cl. ...................... 381/94.3; 704/205; 704/206
(58) Field of Classification Search ................ 381/94.3, 381/94.2, 94.1, 98; 704/205, 206, 200.1, 704/211, 500, E19.01, 216, 217, 218
See application file for complete search history.

(56) References Cited

U.S. PATENT DOCUMENTS

| 4,837,618 | A | | 6/1989 | Hatori |
| 5,806,024 | A | | 9/1998 | Ozawa |
| 5,845,241 | A | * | 12/1998 | Owechko ..................... 704/203 |
| 5,867,593 | A | | 2/1999 | Fukuda et al. |
| 6,038,369 | A | * | 3/2000 | Imai ............................ 386/95 |
| 6,226,606 | B1 | | 5/2001 | Acero et al. |
| 6,330,428 | B1 | | 12/2001 | Lewis et al. |
| 6,438,165 | B2 | | 8/2002 | Normile |
| 6,628,833 | B1 | | 9/2003 | Horie |

(Continued)

FOREIGN PATENT DOCUMENTS

EP 0 267 581 5/1988

(Continued)

OTHER PUBLICATIONS

Baghai-Ravary, Beet, and Tokhi "The two-dimensional discrete cosine transform applied to speechdata", Acoustics, Speech, and Signal Processing, 1996. ICASSP-96. Conference Proceedings., 1996 IEEE International Conference, Mar. 1996.*

(Continued)

*Primary Examiner*—Vivian Chin
*Assistant Examiner*—Con P Tran
(74) *Attorney, Agent, or Firm*—Robert J. Depke; Rockey, Depke & Lyons, LLC

(57) ABSTRACT

A signal processing method divides a first signal of two signals to be compared in similarity into smaller regions, selects one of the regions, and calculates the correlation of the selected one with the other second signal. The method finds a time difference, an expansion factor, and a similarity in one region in which the maximum similarity as the square of the correlation is obtained, and performs integration in the position represented by the time difference and the expansion factor of values based on similarities. The method performs similar processing on all the regions, and evaluates similarity by, in a peak where the integrated value of similarities is a maximum, compares its magnitude with a threshold value. The region corresponding to the peak can be extracted.

42 Claims, 13 Drawing Sheets

U.S. PATENT DOCUMENTS

| | | |
|---|---|---|
| 6,661,918 B1 | 12/2003 | Gordon et al. |
| 6,859,552 B2 | 2/2005 | Izume et al. |
| 6,907,367 B2 | 6/2005 | Baggenstoss |
| 7,010,160 B1 | 3/2006 | Yoshida |
| 7,031,501 B2 | 4/2006 | Adachi et al. |

FOREIGN PATENT DOCUMENTS

| | | | |
|---|---|---|---|
| EP | 0 869 445 | | 10/1998 |
| EP | 0 973 336 | | 1/2000 |
| JP | 63-121372 | | 5/1988 |
| JP | 02-312383 | | 12/1990 |
| JP | 08-079760 | | 3/1996 |
| JP | 408079760 | * | 3/1996 |
| JP | 10-336593 | | 12/1998 |
| JP | 11-328311 | | 11/1999 |
| JP | 2000-078589 | | 3/2000 |
| JP | 2000-312343 | | 11/2000 |
| JP | 2001-228900 | | 8/2001 |

OTHER PUBLICATIONS

The Transaction of the Institute of Electronics, Information and Communication Engineers D-11, Oct. 1, 2001, vol. J84-D-II, No. 10, pp. 2270-2279.

Hiroyuki Hirayama et al., Zatsuon Shori, first edition, The Society of Instrument and Control Engineers, 1985, pp. 182 to 184.

E. Wold et al., "Content-Based Classification, Search, and Retrieval of Audio", IEEE Multimedia, 1996, pp. 27 to 36.

* cited by examiner

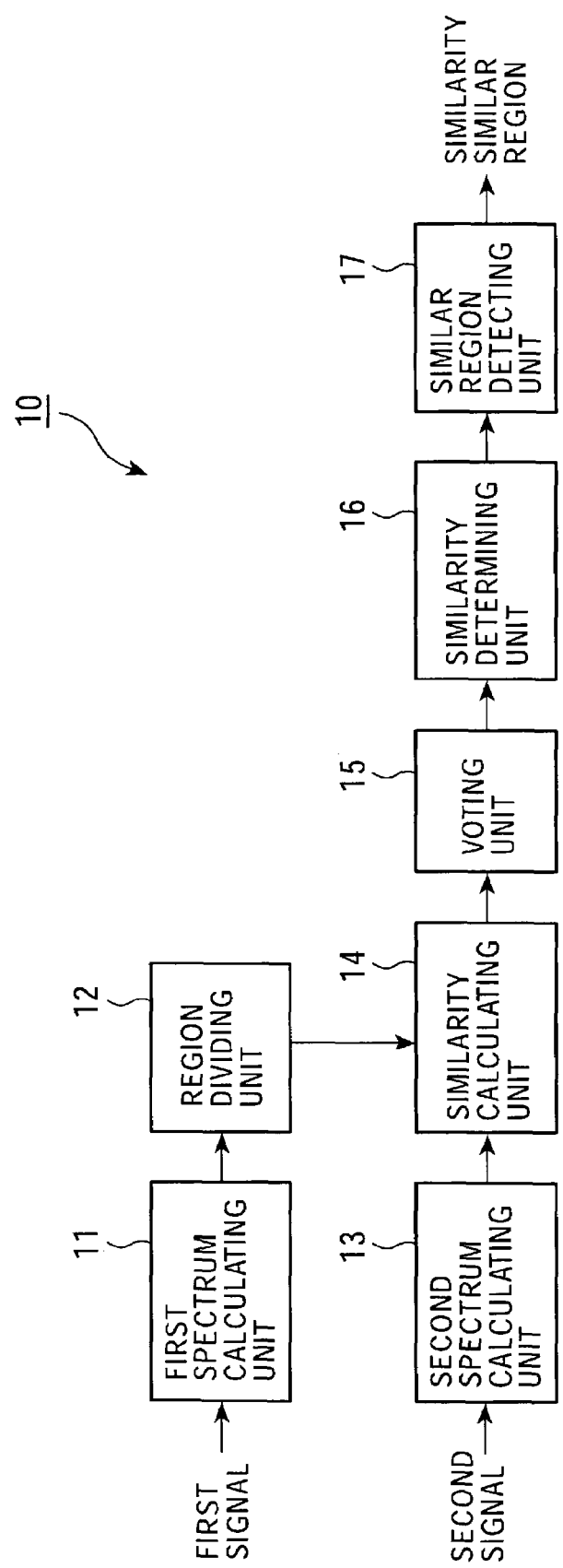

US 7,720,235 B2

SIGNAL PROCESSING METHOD AND APPARATUS, SIGNAL PROCESSING PROGRAM, AND RECORDING MEDIUM

This application claims priority to Japanese Patent Application No. JP2001-324254 filed Oct. 22, 2001, which is incorporated herein by reference.

BACKGROUND OF THE INVENTION

1. Field of the Invention

The present invention relates to signal processing methods and apparatuses, signal processing programs, and recording media, and in particular, to a signal processing method and apparatus for evaluating similarity between different sections of at least one audio signal which include identical or similar audio signal components, a signal processing program used therewith, and a recording medium containing the signal processing program.

2. Description of the Related Art

In general, an audio signal consists of a plurality of signal components which are simultaneously or consecutively superimposed on one another. However, even different audio signals may include identical or similar signal components. For example, in television and radio broadcasting, there are many cases in which, in even different conversations or narrations, common background music is superimposed on the sound.

Also, in many cases, at the start or end of a program broadcasted in series, a voice, music, or sound effect is used in common. Moreover, in some commercials provided by a single company, by using common audio-signal components for advertisements for different products, customers can be informed that the products are produced by the single company.

As described above, in many cases, between scenes (sections of a video/audio signal) related to each other, common audio-signal components are used in the background. Therefore, if a partially identical or similar portion of the audio signal can be detected, it is possible to perform high speed retrieval of a scene related to another, such as a similar audio-signal portion, a video-signal portion accompanying it, a related scene in a program, a scene in a series of programs, or a commercial of a single company.

Technologies that compare an input signal with a prerecorded signal and determine whether the signals are identical include, for example, a technology using correlation between an audio signal and its spectrum, and the technology disclosed in Japanese Unexamined Patent Application Publication No. 2000-312343.

In the above technology using correlation, when a plurality of audio signals or different components between the spectra of the signals are sufficiently weak, two signals are correlated with each other while the time between the signals is being shifted, and a correlation at maximum shifted time is used to evaluate similarity. However, when the different components are not sufficiently weak, appropriate evaluation of similarity cannot be performed.

Also, in the technology disclosed in Japanese Unexamined Patent Application Publication No. 2000-312343, only an audio signal identical to that recorded can be detected regardless of a difference caused by some noise.

Accordingly, it is impossible for the above technologies to detect music which is used as background music of a program, or audio-signal components used in different commercials of a single company, as described above.

In order to determine whether an input signal is identical to a prerecorded signal by comparing both signals, a common method of the related art correlates the signals with each other while shifting their time domains, and evaluates similarity based on a correlative value at the time that the maximum correlation is obtained. This method has a problem in that it cannot perform accurate similarity when a plurality of audio signals, and different components between the spectra of the signals are not sufficiently weak. The following is a specific description.

The short-time spectrum distributions (so-called "spectrograms") of three audio signals (signal A, signal B, and signal C) are shown in FIGS. 1 to 3, respectively. These distributions are obtained from the last two seconds of actually broadcast commercials. Signal A and signal B represent commercials for different products of a single company, and signal C represents a commercial of another company.

As FIGS. 1 and 2 shows, signal A and signal B include acoustically similar components which give an idea of the company, but the signal C in FIG. 3 does not include such a component. From the comparison between the signal-A spectrum distribution and the signal-B spectrum distribution, similar components and superimposition of different components are observed, though both distributions have a temporal shift.

Regarding the three audio signals, the results of correlative calculation on the spectrum of signal B and the spectrum of signal C, which are obtained with sections of the spectrum of signal A used as templates, are shown in FIGS. 4A and 4B. The templates are 0.5-second sections that start at the 0-second position, 0.25-second position, 0.5-second position, 0.75-second position, 1-second position, 1.25-second position, and 1.5-second position of signal A.

FIG. 4A shows the result of correlative detection on the signal-B spectrum. This is obtained by using the template starting at the 1.5-second position of the signal-A spectrum. FIG. 4B shows the result of correlative detection on the signal-C spectrum. This is obtained by using the template starting at the 0.75-second position of the signal-A spectrum.

The maximum correlation between signal A and signal B is 0.657, while the maximum correlation between signal A and signal C is 0.642, which are indicated by the arrows in FIGS. 4A and 4B, so that both have almost no difference. This is not because signal A and signal C are similar to each other, but because different components between signal A and signal B are not weak since both have only a maximum correlation of approximately 0.65.

As described above, the correlation method is not always suitable for detection, classification, and retrieval of similar scenes.

SUMMARY OF THE INVENTION

It is an object of the present invention to provide a signal processing method and apparatus that detect a similar signal component from a signal, even if a different signal is superimposed on the signal, and quantitatively evaluates the similarity of the component, a signal processing program used therewith, and a recording medium containing the signal processing program.

According to an aspect of the present invention, the foregoing object is achieved by provision of a signal processing method including: a spectral transformation step for transforming a plurality of input audio signals into time-frequency distributions; a dividing step in which, among the time-frequency distributions corresponding to the audio signals, the distribution corresponding to at least one audio signal is divided into a plurality of smaller regions; a parameter extracting step for extracting transformation parameters obtained when transformation of the smaller regions is performed for establishing similarity to another audio signal; a totaling step for totaling similarity values which are calculated based on the transformation parameters; and a similarity evaluating step for, based on the totaled result, evaluating similarities among the audio signals.

Preferably, the signal processing method further includes a similar-section extracting step for detecting a similar section which is common to the distributions corresponding to the audio signals.

The transformation parameters may be calculated by using a correlative method.

In this case, the transformation parameters may include at least one of an expansion factor and a time difference which are obtained when the correlation of the smaller regions with the distribution corresponding to the other audio signal is at the maximum.

In the totaling step, in a space using the transformation parameters as axes, values representing similarities among the audio signals may be totaled.

According to the signal processing method, a plurality of input audio signals are transformed into time-frequency distributions, and at least one of the distributions is divided into a plurality of smaller regions. For each smaller region, a similarity to another audio signal is calculated, and by totaling the similarities, similarities among the audio signals are evaluated. Based on the similarities, a similar section common to the audio signals is extracted.

This makes it possible to perform similarity detection and similar-region detection on partially similar audio signals which cannot be detected as in the related art.

According to another aspect of the present invention, the foregoing object is achieved through provision of a signal processing method including: a playback step for playing back an audio signal recorded in recording unit; a retrieval-position designating step for designating a desired retrieval position in the played-back audio signal; a spectral transformation step for transforming a portion of the audio signal in the retrieval position and retrieval part of the audio signal into time-frequency distributions; a dividing step for dividing the distribution corresponding to the portion in the desired retrieval position into a plurality of smaller regions; a parameter extracting step for extracting transformation parameters obtained when the smaller regions are transformed for establishing similarity to the retrieval part; a totaling step for totaling similarity values which are calculated based on the transformation parameters; a similarity evaluating step for, based on the totaled result, evaluating the similarity of the portion in the desired retrieval position to the retrieval part; and a similar-region detecting step for detecting each of the smaller regions of the portion in the desired retrieval position which is similar to the retrieval part.

According to the signal processing method, when a desired retrieval position is designated in a played-back audio signal, a portion of the audio signal in the retrieval position and retrieval part of the audio signal are transformed into time-frequency distributions. The distribution corresponding to the portion in the retrieval position is divided into a plurality of smaller regions. The similarities of the smaller regions to the retrieval part are calculated and totaled, whereby the similarities are evaluated. Based on the similarities, a similar section is extracted.

Therefore, by designating a desired retrieval position in the played-back audio signal, an audio signal which is similar to the portion in the retrieval position can be retrieved from the retrieval part of the audio signal.

According to another aspect of the present invention, the foregoing object is achieved through provision of a signal processing method including: a spectral transformation step for transforming a plurality of input audio signals into time-frequency distributions; a dividing step in which, among the time-frequency distributions corresponding to the audio signals, the distribution corresponding to at least one audio signal is divided into a plurality of smaller regions; a parameter extracting step for extracting transformation parameters obtained when transformation of the smaller regions is performed for establishing similarity to another audio signal; a totaling step for totaling similarity values which are calculated based on the transformation parameters; a similarity evaluating step for, based on the totaled result, evaluating similarities among the audio signals; a similar-section extracting step for detecting a similar section which is common to the distributions corresponding to the audio signals; a first encoding step for encoding the similar section detected in the similar-section extracting step; and a second encoding step for encoding a dissimilar section other than the similar section.

Preferably, the transformation is at least one of expansion and transformation by shifting. In this case, in the first encoding step, information including the location of the similar section, an expansion factor, and the shape of the similar section may be encoded.

According to the signal processing method, a plurality of input audio signals are transformed into time-frequency distributions, and at least one of the display-off scanning signal is divided into a plurality of smaller regions. The similarities of the smaller regions to another audio signal are calculated and totaled, whereby similarities among the audio signals are evaluated. Based on the similarities, a similar section common to the audio signals is extracted, and the similar section and the other dissimilar section are separately encoded.

This can increase the efficiency of encoding compared with the case of performing encoding by using a common encoding method.

According to another aspect of the present invention, the foregoing object is achieved through provision of a signal processing apparatus including: a spectral transformation unit for transforming a plurality of input audio signals into time-frequency distributions; a dividing unit in which, among the time-frequency distributions corresponding to the audio signals, the distribution corresponding to at least one audio signal is divided into a plurality of smaller regions; a parameter extracting unit for extracting transformation parameters obtained when transformation of the smaller regions is performed for establishing similarity to another audio signal; a totaling unit for totaling similarity values which are calculated based on the transformation parameters; and a similarity evaluating unit for, based on the totaled result, evaluating similarities among the audio signals.

Preferably, the signal processing apparatus further includes a similar-section extracting unit for detecting a similar section which is common to the distributions corresponding to the audio signals.

The transformation parameters may be calculated by using a correlative method.

The transformation parameters may include at least one of an expansion factor and a time difference which are obtained when the correlation of the smaller regions with the distribution corresponding to the other audio signal is at the maximum.

In the totaling unit, in a space using the transformation parameters as axes, values representing similarities among the audio signals may be totaled.

According to the signal processing apparatus, a plurality of input audio signals are transformed into time-frequency distributions, and at least one of the display-off scanning signal is divided into a plurality of smaller regions. The similarities of the smaller regions to another audio signal are calculated and totaled, whereby similarities among the audio signals are evaluated. Based on the similarities, a similar section common to the audio signals is extracted.

This makes it possible to perform similarity detection and similar-region detection on partially similar audio signals which cannot be detected as in the related art.

According to another aspect of the present invention, the foregoing object is achieved through provision of a signal processing apparatus including: a recording unit in which a plurality of audio signals are recorded; a playback unit for playing back the audio signals; a retrieval-position designating unit for designating a desired retrieval position in the played-back audio signals; a spectral transformation unit for transforming a portion of the audio signals in the desired position and retrieval part of the audio signals into time-frequency distributions; a dividing unit for dividing the distribution corresponding to the portion in the desired position into a plurality of smaller regions; a parameter extracting unit for extracting transformation parameters which are obtained when the smaller regions are transformed for establishing similarity to the retrieval part; a voting unit for totaling similarity values which are calculated based on the transformation parameters; a similarity evaluating unit for, based on the totaled result, evaluating the similarity of the portion in the desired position to the retrieval part; and a similar-region detecting unit for detecting the similarity to the retrieval part of each of the smaller regions corresponding to the portion in the desired position.

According to the signal processing apparatus, when a desired retrieval position is designated in played-back audio signals, a portion of the audio signals in the retrieval position and retrieval part of the audio signals are transformed into time-frequency distributions, and the distribution corresponding to the portion in the retrieval position is divided into a plurality of smaller regions. The similarities of the smaller regions to the retrieval part of the audio signals are calculated and totaled, whereby similarities among the audio signals are evaluated, and based on the similarities, a similar section is extracted.

Therefore, by designating a desired retrieval position in the played-back audio signal, an audio signal which is similar to the portion in the retrieval position can be retrieved from the retrieval part of the audio signal.

According to another aspect of the present invention, the foregoing object is achieved through provision of a signal processing apparatus including: a spectral transformation unit for transforming a plurality of input audio signals into time-frequency distributions; a dividing unit in which, among the time-frequency distributions corresponding to the audio signals, the distribution corresponding to at least one audio signal is divided into a plurality of smaller regions; a parameter extracting unit for extracting transformation parameters obtained when transformation of the smaller regions is performed for establishing similarity to another audio signal; a voting unit for totaling similarity values which are calculated based on the transformation parameters; a similarity evaluating unit for, based on the totaled result, evaluating similarities among the audio signals; a similar-section extracting unit for detecting a similar section which is common to the distributions corresponding to the audio signals; a first encoding unit for encoding the similar section detected in said similar-section extracting unit; and a second encoding unit for encoding a dissimilar section other than the similar section.

Preferably, the transformation is at least one of expansion and transformation by shifting, and the first encoding unit encodes information including the location of the similar section, an expansion factor, and the shape of the similar section.

According to the signal processing apparatus, a plurality of input audio signals are transformed into time-frequency distributions, and at least one of the display-off scanning signal is divided into a plurality of smaller regions. The similarities of the smaller regions to another audio signal are calculated and totaled, whereby similarities among the audio signals are evaluated. Based on the similarities, a similar section common to the audio signals is extracted, and the similar section and the other dissimilar section are separately encoded.

This can increase the efficiency of encoding compared with the case of performing encoding by using a common encoding method.

According to another aspect of the present invention, the foregoing object is achieved through provision of a signal processing program including: a spectral transformation step for transforming a plurality of input audio signals into time-frequency distributions; a dividing step in which, among the time-frequency distributions corresponding to the audio signals, the distribution corresponding to at least one audio signal is divided into a plurality of smaller regions; a parameter extracting step for extracting transformation parameters obtained when transformation of the smaller regions is performed for establishing similarity to another audio signal; a totaling step for totaling similarity values which are calculated based on the transformation parameters; and a similarity evaluating step for, based on the totaled result, evaluating similarities among the audio signals.

Preferably, the signal processing program further includes a similar-section extracting step for detecting a similar section which is common to the distributions corresponding to the audio signals.

In the similar-section extracting step, one of the smaller regions may be detected from which transformation parameters being almost equal to the values of the transformation parameters at the maximum of the totaled result are extracted.

The transformation may be at least one of expansion and transformation by shifting.

The transformation parameters may be calculated by using a correlative method.

The transformation parameters may include at least one of an expansion factor and a time difference which are obtained when the correlation of the smaller regions with the distribution corresponding to the other audio signal is at the maximum.

In the totaling step, in a space using the transformation parameters as axes, values representing similarities among the audio signals may be totaled.

According to another aspect of the present invention, the foregoing object is achieved through provision of a signal processing program including: a playback step for playing back an audio signal recorded in recording unit; a retrieval-position designating step for designating a desired retrieval position in the played-back audio signal; a spectral transformation step for transforming a portion of the audio signal in the retrieval position and retrieval part of the audio signal into time-frequency distributions; a dividing step for dividing the distribution corresponding to the portion in the desired retrieval position into a plurality of smaller regions; a parameter extracting step for extracting transformation parameters obtained when the smaller regions are transformed for establishing similarity to the retrieval part; a totaling step for totaling similarity values which are calculated based on the transformation parameters; a similarity evaluating step for, based on the totaled result, evaluating the similarity of the portion in the desired retrieval position to the retrieval part; and a similar-region detecting step for detecting each of the smaller regions of the portion in the desired retrieval position which is similar to the retrieval part.

According to the signal processing program, when a desired retrieval position is designated in played-back audio signals, a portion of the audio signals in the retrieval position and retrieval part of the audio signals are transformed into time-frequency distributions, and the distribution corresponding to the portion in the retrieval position is divided into a plurality of smaller regions. The similarities of the smaller regions to the retrieval part of the audio signals are calculated and totaled, whereby similarities among the audio signals are evaluated, and based on the similarities, a similar section is extracted.

This makes it possible to perform similarity detection and similar-region detection on partially similar audio signals which cannot be detected as in the related art.

According to another aspect of the present invention, the foregoing object is achieved through provision of a signal processing program including: a spectral transformation step for transforming a plurality of input audio signals into time-frequency distributions; a dividing step in which, among the time-frequency distributions corresponding to the audio signals, the distribution corresponding to at least one audio signal is divided into a plurality of smaller regions; a parameter extracting step for extracting transformation parameters obtained when transformation of the smaller regions is performed for establishing similarity to another audio signal; a totaling step for totaling similarity values which are calculated based on the transformation parameters; a similarity evaluating step for, based on the totaled result, evaluating similarities among the audio signals; a similar-section extracting step for detecting a similar section which is common to the distributions corresponding to the audio signals; a first encoding step for encoding the similar section detected in the similar-section extracting step; and a second encoding step for encoding a dissimilar section other than the similar section.

Preferably, the transformation is at least one of expansion and transformation by shifting, and in the first encoding step, information including the location of the similar section, an expansion factor, and the shape of the similar section is encoded.

According to the signal processing program, a plurality of input audio signals are transformed into time-frequency distributions, and at least one of the display-off scanning signal is divided into a plurality of smaller regions. The similarities of the smaller regions to another audio signal are calculated and totaled, whereby similarities among the audio signals are evaluated. Based on the similarities, a similar section common to the audio signals is extracted, and the similar section and the other dissimilar section are separately encoded.

This can increase the efficiency of encoding compared with the case of performing encoding by using a common encoding method.

According to another aspect of the present invention, the foregoing object is achieved through provision of a recording medium controllable by a computer, which contains a signal processing program including: a spectral transformation step for transforming a plurality of input audio signals into time-frequency distributions; a dividing step in which, among the time-frequency distributions corresponding to the audio signals, the distribution corresponding to at least one audio signal is divided into a plurality of smaller regions; a parameter extracting step for extracting transformation parameters obtained when transformation of the smaller regions is performed for establishing similarity to another audio signal; a totaling step for totaling similarity values which are calculated based on the transformation parameters; and a similarity evaluating step for, based on the totaled result, evaluating similarities among the audio signals.

Preferably, the signal processing program further includes a similar-section extracting step for detecting a similar section which is common to the distributions corresponding to the audio signals.

The transformation parameters may be calculated by using a correlative method.

The transformation parameters may include at least one of an expansion factor and a time difference which are obtained when the correlation of the smaller regions with the distribution corresponding to the other audio signal is at the maximum.

In the totaling step, in a space using the transformation parameters as axes, values representing similarities among the audio signals may be totaled.

According to the signal processing program in the recording medium, a plurality of input audio signals are transformed into time-frequency distributions, and at least one of the display-off scanning signal is divided into a plurality of smaller regions. The similarities of the smaller regions to another audio signal are calculated and totaled, whereby similarities among the audio signals are evaluated. Based on the similarities, a similar section common to the audio signals is extracted.

This can increase the efficiency of encoding compared with the case of performing encoding by using a common encoding method.

According to another aspect of the present invention, the foregoing object is achieved through provision of a recording medium controllable by a computer, which controls a signal processing program including: a playback step for playing back an audio signal recorded in recording unit; a retrieval-position designating step for designating a desired retrieval position in the played-back audio signal; a spectral transformation step for transforming a portion of the audio signal in the retrieval position and retrieval part of the audio signal into time-frequency distributions; a dividing step for dividing the distribution corresponding to the portion in the desired retrieval position into a plurality of smaller regions; a parameter extracting step for extracting transformation parameters obtained when the smaller regions are transformed for establishing similarity to the retrieval part; a totaling step for totaling similarity values which are calculated based on the transformation parameters; a similarity evaluating step for, based on the totaled result, evaluating the similarity of the portion in the desired retrieval position to the retrieval part; and a similar-region detecting step for detecting each of the smaller regions of the portion in the desired retrieval position which is similar to the retrieval part.

According to the signal processing program in the recording medium, when a desired retrieval position is designated in played-back audio signals, a portion of the audio signals in the retrieval position and retrieval part of the audio signals are transformed into time-frequency distributions, and the distribution corresponding to the portion in the retrieval position is divided into a plurality of smaller regions. The similarities of the smaller regions to the retrieval part of the audio signals are calculated and totaled, whereby similarities among the audio signals are evaluated, and based on the similarities, a similar section is extracted.

Therefore, by designating a desired retrieval position in the played-back audio signal, an audio signal which is similar to the portion in the retrieval position can be retrieved from the retrieval part of the audio signal.

According to another aspect of the present invention, the foregoing object is achieved through provision of a recording medium controllable by a computer, which contains a signal processing program including: a spectral transformation step for transforming a plurality of input audio signals into time-frequency distributions; a dividing step in which, among the time-frequency distributions corresponding to the audio signals, the distribution corresponding to at least one audio signal is divided into a plurality of smaller regions; a parameter extracting step for extracting transformation parameters obtained when transformation of the smaller regions is performed for establishing similarity to another audio signal; a totaling step for totaling similarity values which are calculated based on the transformation parameters; a similarity evaluating step for, based on the totaled result, evaluating similarities among the audio signals; a similar-section extracting step for detecting a similar section which is common to the distributions corresponding to the audio signals; a first encoding step for encoding the similar section detected in the similar-section extracting step; and a second encoding step for encoding a dissimilar section other than the similar section.

Preferably, the transformation is at least one of expansion and transformation by shifting, and in the first encoding step, information including the location of the similar section, an expansion factor, and the shape of the similar section is encoded.

According to the signal processing program in the recording medium, a plurality of input audio signals are transformed into time-frequency distributions, and at least one of the display-off scanning signal is divided into a plurality of smaller regions. The similarities of the smaller regions to another audio signal are calculated and totaled, whereby similarities among the audio signals are evaluated. Based on the similarities, a similar section common to the audio signals is extracted, and the similar section and the other dissimilar section are separately encoded.

This can increase the efficiency of encoding compared with the case of performing encoding by using a common encoding method.

BRIEF DESCRIPTION OF THE DRAWINGS

FIGS. 4A and 4B are graphs illustrating the results of correlative calculation on the spectra of signal B and signal C by using a section of the spectrum of signal A as a template, in which FIG. 4A shows the results for signal B and FIG. 4B shows the results for signal C;

FIG. 5 is a block diagram briefly showing the structure of a signal processing apparatus according to an embodiment of the present invention;

FIGS. 6A, 6B, 6C are graphs illustrating a first signal, a second signal, and a voting space, respectively, regarding the operation principle of the signal processing apparatus in FIG. 5, in which FIG. 6A shows the division of a first signal into smaller regions, FIG. 6B shows detection of a similar region in signal g(x), and FIG. 6C shows casting of parameters in the region into a voting space;

FIGS. 8A and 8B are graphs illustrating the applications to signal A and signal B of a signal processing method used in the signal processing apparatus in FIG. 5, in which FIG. 8A shows the distribution of casting results obtained when signal A is used as a first signal and signal B is used as a second signal, and FIG. 8B shows the distribution of casting results obtained when signal A is used as a first signal and signal C is used as a second signal;

FIGS. 14A to 14D are graphs illustrating the operation of the audio/video retrieving apparatus in FIG. 10, in which FIG. 14A shows selection of a first section and a second section, FIG. 14B shows extraction of a portion of the second section which is identical to that of the first section, FIG. 14C shows encoding of the first section, and FIG. 14D shows new selection of the first section.

DESCRIPTION OF THE PREFERRED EMBODIMENTS

Figure 1:
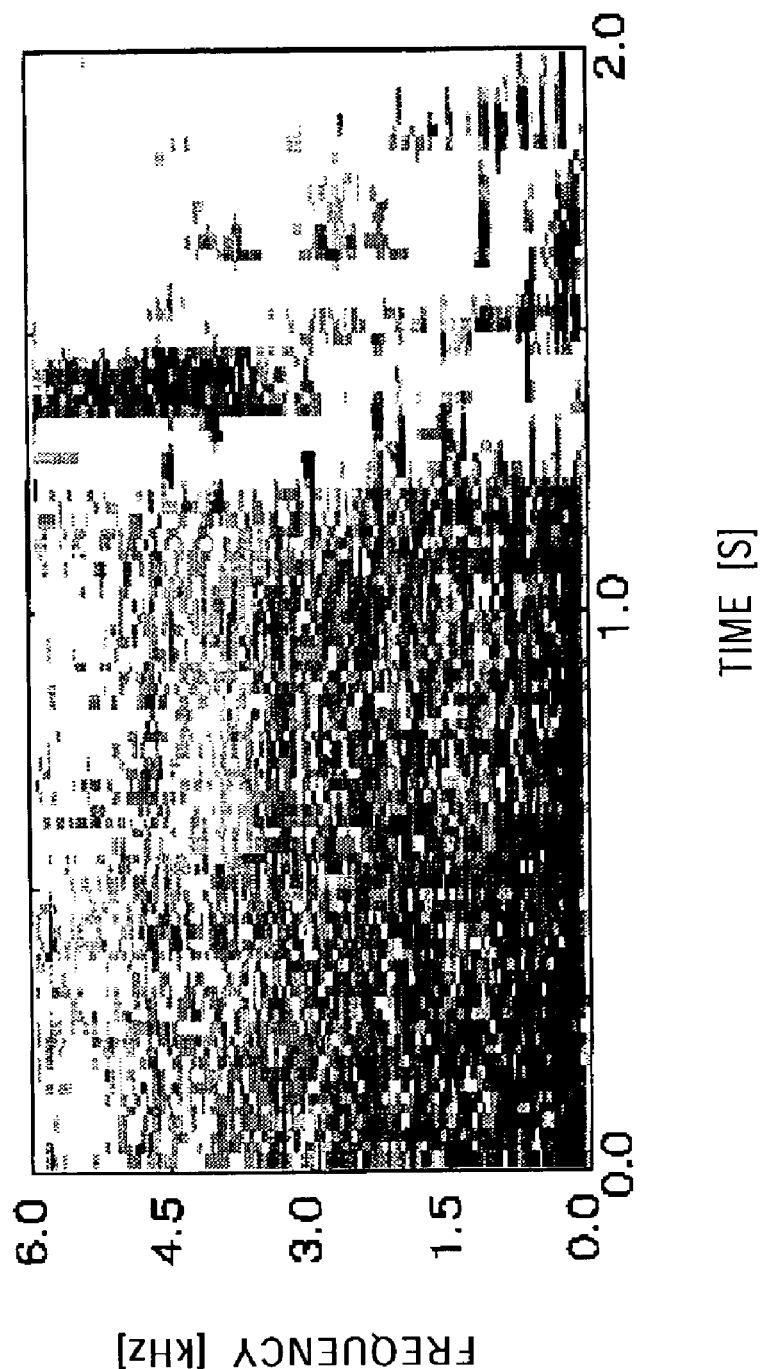
FIG. 1 is a graph illustrating a case in which similarity cannot be appropriately found by using a correlation method of the related art, and shows the short-time spectral distribution of signal A.

A specific embodiment of the present invention is fully described below with reference to the accompanying drawings. In this embodiment, the present invention is applied to a signal processing apparatus which evaluates similarity between different sections of at least one audio signal which include identical or similar to audio signal components, and which extracts a similar portion.

Accordingly, the signal processing apparatus according to this embodiment evaluates integrated similarity by finding local similarities among a plurality of audio signals, and integrating the similarities, and extracts the similar portion.

At first, the schematic structure of the signal processing apparatus according to this embodiment is shown in FIG. 5. As shown in FIG. 5, a signal processing apparatus 10 includes a first spectrum calculating unit 11, a region dividing unit 12, a second spectrum calculating unit 13, a similarity calculating unit 14, a voting unit 15, a similarity determining unit 16, and a similar region detecting unit 17.

The first spectrum calculating unit 11 transforms a first signal between two signals for comparison into a short-time spectrum distribution. The first spectrum calculating unit 11 uses a filter bank, a Fourier transform, a wavelet transform, etc. The two signals for comparison may be different sections of a single signal.

Figure 6A:
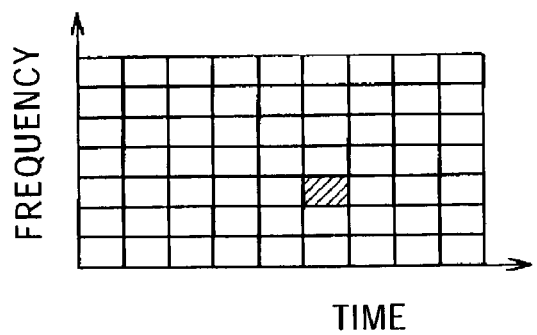

The region dividing unit 12 divides the spectrum distribution of the first signal into smaller regions. For example, the first signal is divided into 63 smaller regions. Obviously, the divisor is not limited to this number, and can be arbitrarily set, as shown in FIG. 6A. Also, although the division is performed so that the smaller regions do not overlap with one another in FIG. 6A, the division may be performed so that the smaller regions can overlap with one another.

The second spectrum calculating unit 13 transforms a second signal of the two signals for comparison into a short-time spectrum distribution. Similarly to the first spectrum calculating unit 11, the second spectrum calculating unit 13 uses a filter bank, a Fourier transform, a wavelet transform, etc.

Figure 6B:
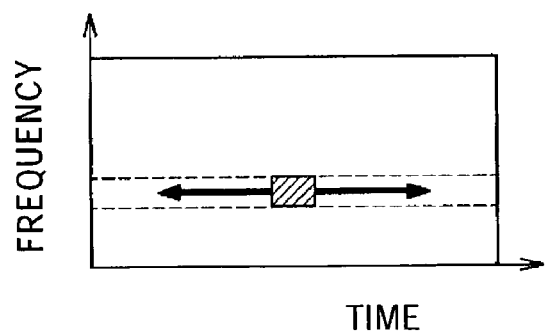

The similarity calculating unit 14 calculates correlation with the second signal of each smaller region obtained by the region dividing unit 12. As shown in FIG. 6B, normally, correlation calculation may be performed while only time difference is being changed in a single frequency band.

When those which exhibit similar frequency-change patterns are regarded as similar signals, even if the fundamental frequencies differ, shifting in the frequency direction may be also performed. The similarity calculating unit 14 retrieves the maximum correlation from the calculated correlations, and acquires similarity "s", time difference "t", and expansion factor "a", where similarity "s" is the square of a correlation, and expansion factor "a" is a multiplication factor set so that the pattern of the smaller regions has the maximum size matching with the pattern of the second signal.

Figure 6C:
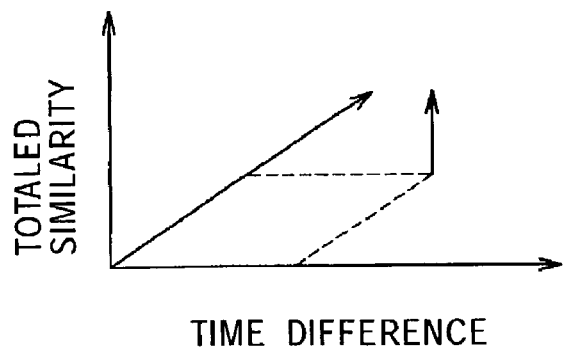

The voting unit 15 casts the obtained similarity "s", time difference "t", and expansion factor "a" into a voting space. As FIG. 6C shows, the voting space is a characteristic space that has time difference "t" and expansion factor "a" as variables, and totaled values of similarity "s". In the positions corresponding to the values of time difference "t" and the values of expansion factor "a", which are obtained from the smaller regions, the values of similarity "s" are totaled.

When the first signal and the second signal include similar audio-signal components, the patterns of the corresponding smaller regions of both signals are similar to each other. Thus, high similarity "s" is obtained, and the time difference "t" and expansion factor "a" roughly match those of the other smaller regions.

Conversely, in smaller regions that do not correspond to the dissimilar portions, the maximum correlation is obtained in the accidentally most similar position. Thus, the similarity "s" in that case is low, and the time difference "t" and expansion "a" are not related to the other smaller regions.

Accordingly, when the similar audio-signal components are found, casting from smaller regions corresponding to the components concentrates in a single position. Thus, it is expected that a peak having a significant size is formed. When no similar audio-signal components are found, voting values are originally small, and casting from all the regions is distributed in different positions, so that no significant peak is formed.

The similarity determining unit 16 retrieves the maximum similarity $s_m$ in the voting space after voting for all the smaller regions is performed. The similarity determining unit 16 performs similarity determination by comparing the maximum similarity $s_m$ with a threshold value $s_{thsd}$.

When the similarity determining unit 16 determines that both signals have similar audio-signal components, the similar region detecting unit 17 detects the similar regions. The similar region detecting unit 17 detects the similar regions by selecting only sufficiently close values, for example, time difference $t_m$ and expansion factor $a_m$ which are obtained when the time difference "t" and the expansion factor "a" of each smaller region are in peak.

Figure 7:
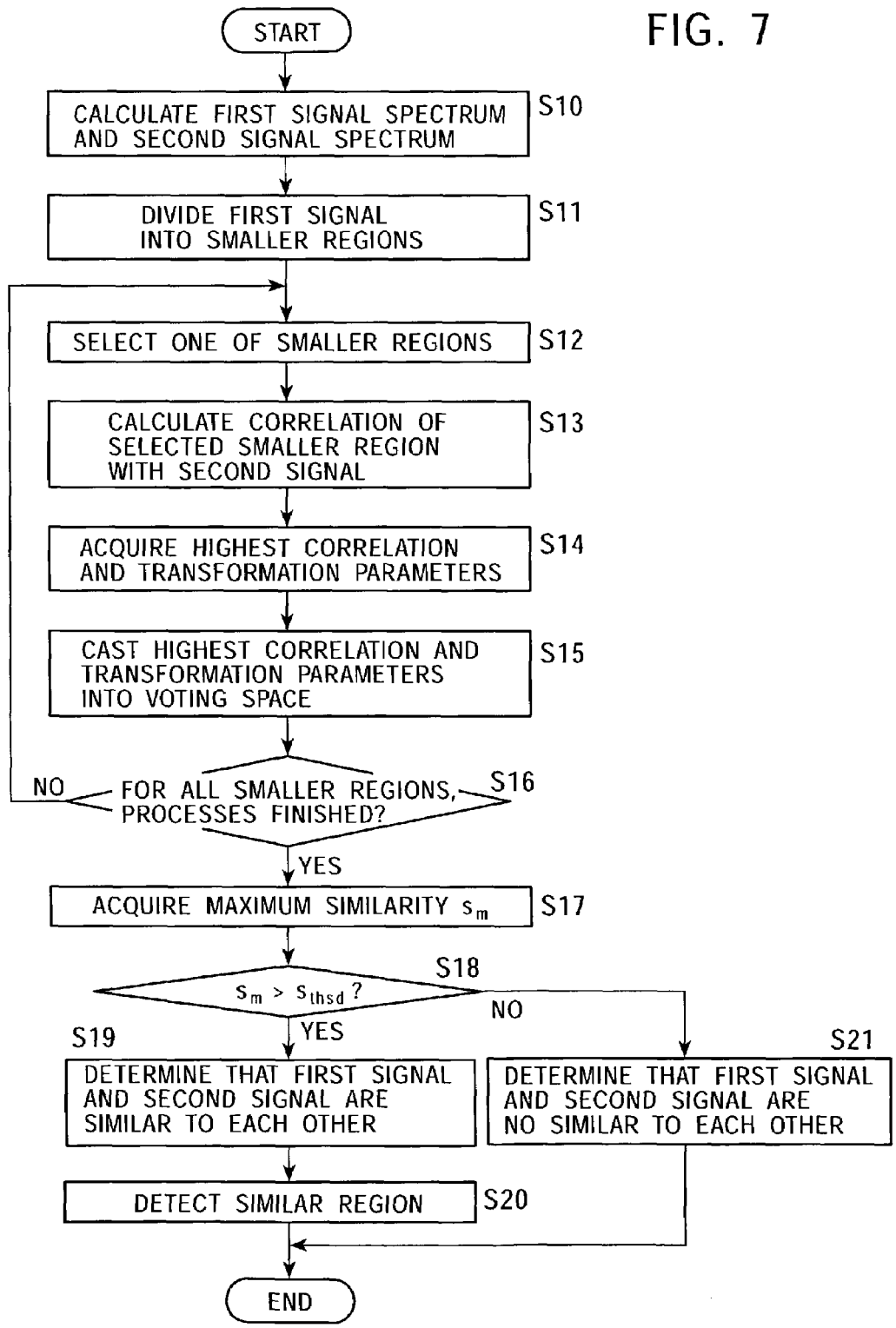
FIG. 7 is a flowchart illustrating the operation of the signal processing apparatus in FIG. 5.

As described above, the operation of the signal processing apparatus 10 having the above-described structure is described with reference to the flowchart in FIG. 7.

In step S10, the first signal and the second signal are transformed into spectra.

In step S11, the first signal is divided into smaller regions, and in step S12, one smaller region is selected from the smaller regions.

In step S13, the correlation with the second signal of the region selected in step S12 is calculated. In other words, for example, regarding the selected region, by simply changing the time difference in a single frequency band, the correlation with the second signal is calculated.

In step S14, from the correlations obtained in step S13, the maximum correlation is retrieved, and similarity "s", time difference "t", and expansion factor "a" are acquired.

In step S15, the similarity "s", the time difference "t", and the expansion factor "a" which are obtained in step S14 are cast into the voting space. In other words, in the positions of the time difference "t" and the expansion factor "a", the values of similarity "s" are totaled.

In step S16, for all the smaller regions, it is determined whether the above processing has finished. In step S16, smaller regions for which the processing has not finished yet are found, the process returns to step S12, and the above processing is repeatedly performed for the remaining smaller regions. When the above processing has finished for all the regions, the process proceeds to step S17.

In step S17, the maximum similarity $s_m$ in the voting space is retrieved and acquired. In step S18, it is determined whether the maximum similarity $s_m$ is greater than a predetermined threshold value $s_{thsd}$. When it is determined in step S18 that the maximum similarity $s_m$ is not greater than the predetermined threshold value $s_{thsd}$ ("No"), the process proceeds to step S21 since no significant peak is formed. When it is determined in step S18 that the maximum similarity $s_m$ is greater than the predetermined threshold value $s_{thsd}$ ("Yes"), the process proceeds to step S19 since a significant peak is formed.

In step S19, it is determined that the first signal and the second signal are similar to each other, and the time difference $t_m$ and the expansion factor $a_m$ are acquired. The similarity between the first signal and the second signal is represented by $s_m$.

In step S20, similar regions are detected. In other words, sufficiently close values, for example, time difference $t_m$ and expansion factor $a_m$ which are obtained when the time difference "t" and the expansion factor "a" of each smaller region are selected, and the process ends.

Figure 2:
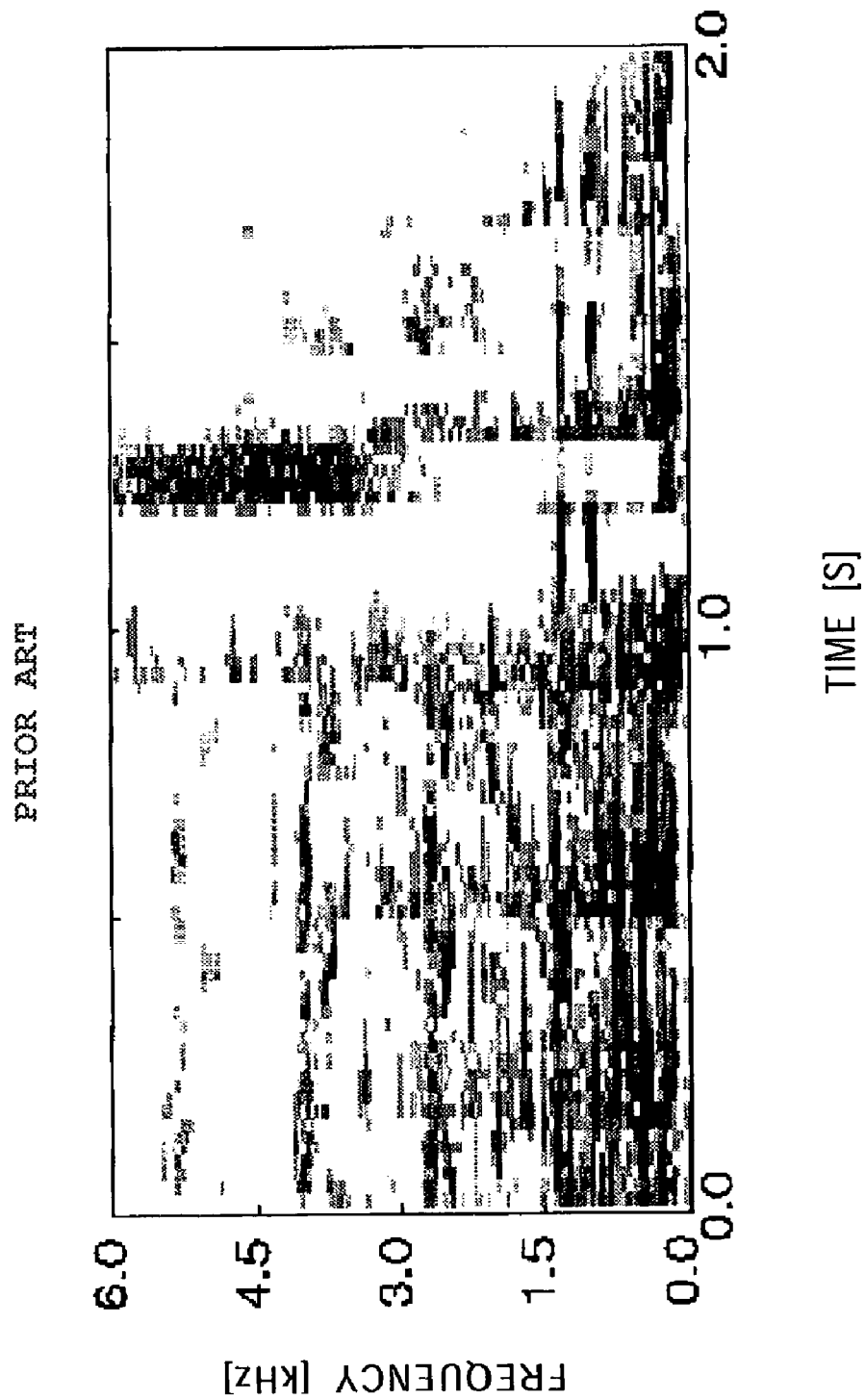
FIG. 2 is a graph illustrating a case in which similarity cannot be appropriately found by using a correlation method of the related art, and shows the short-time spectral distribution of signal B.
Figure 3:
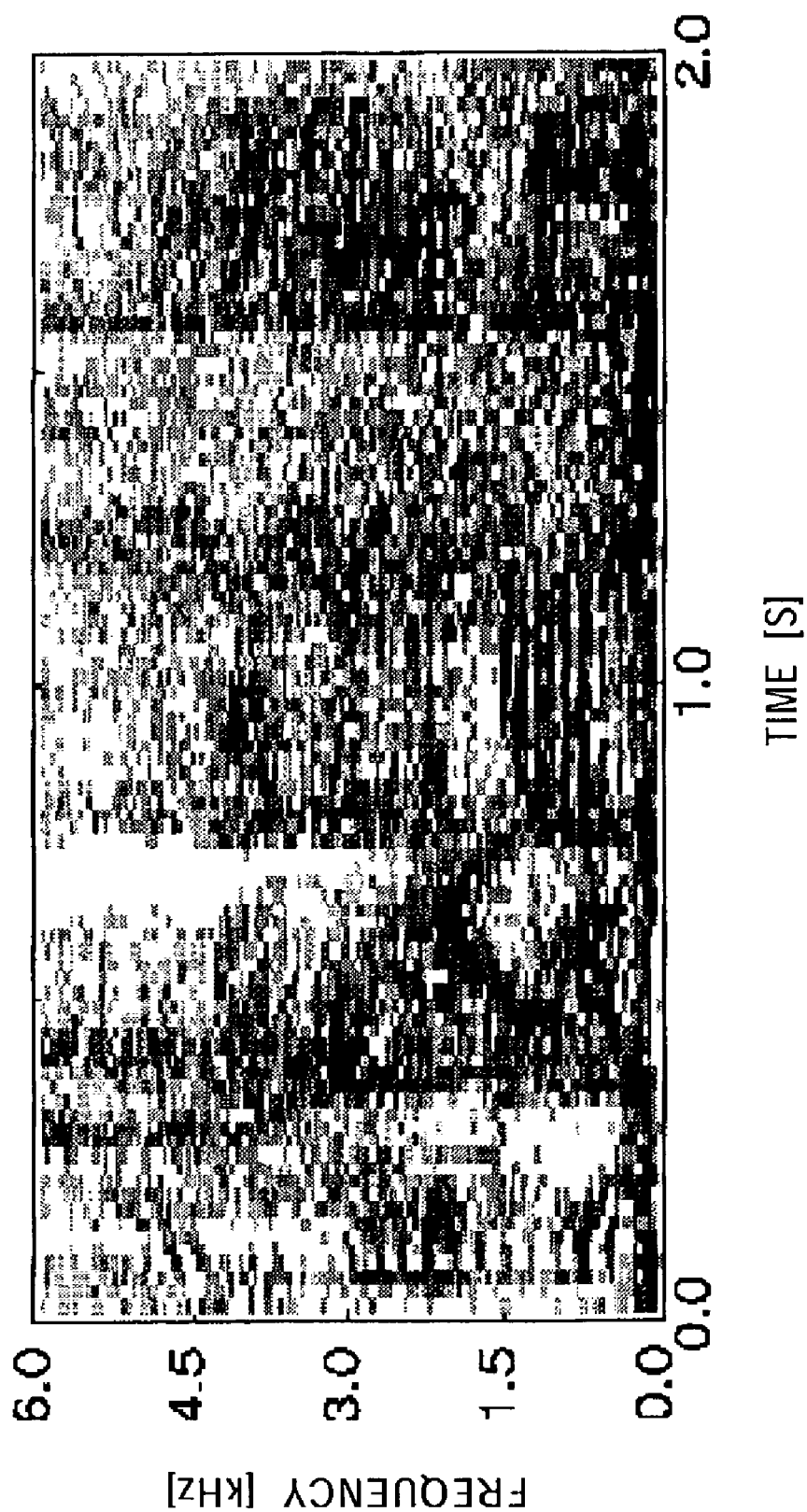
FIG. 3 is a graph illustrating a case in which similarity cannot be appropriately found by using a correlation method of the related art, and shows the short-time spectral distribution of signal B.
Figure 4A:
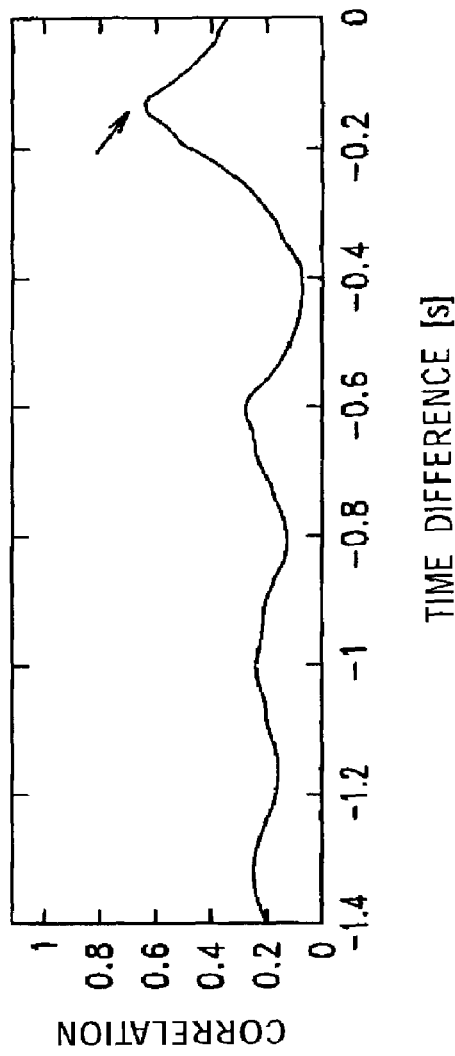
Figure 4B:
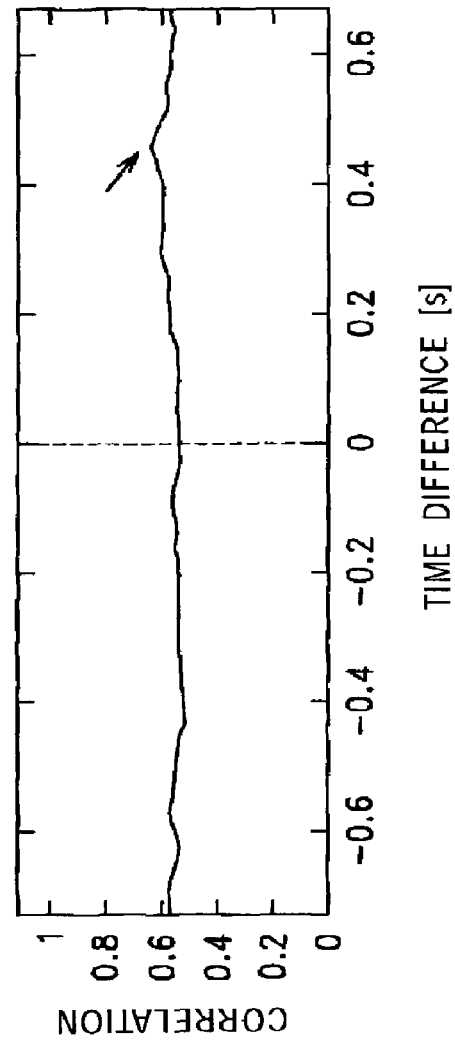
Figure 8A:
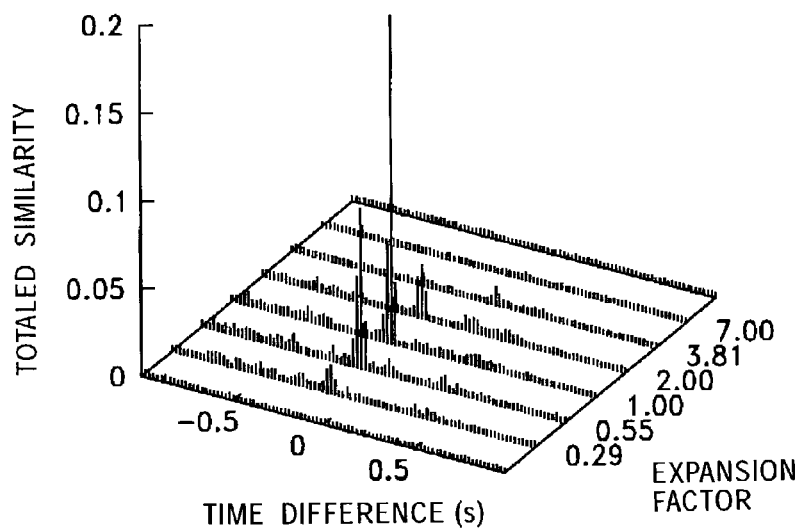
Figure 8B:
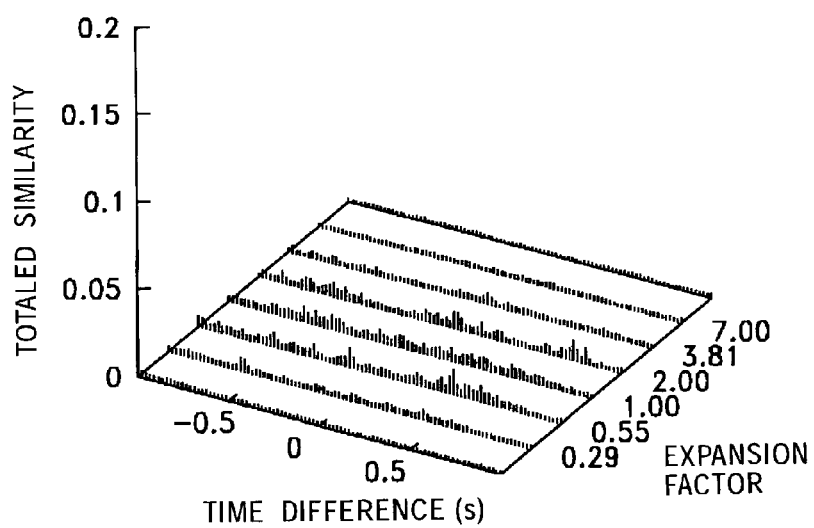

A case in which the above signal processing method is applied to the signal A, signal B, and signal C shown in FIGS. 1 to 3 is shown in FIGS. 8A and 8B. FIG. 8A shows the distribution of voting results obtained by dividing the signal A (FIG. 1) as the first signal into regions, and performing the above processing between the divided first signal and the signal B (FIG. 2) as the second signal. FIG. 8B shows the distribution of voting results obtained by dividing the signal A as the first signal into regions, and performing the above processing between the divided first signal and the signal C (FIG. 3) as the second signal. These distributions are formed when the above processing has finished for all the regions.

It is confirmed that, in FIG. 8A, a significant peak is formed at the position corresponding to approximately a time difference of 0.13 seconds and an expansion factor of 1.0, while in FIG. 8B, the cast values are distributed and no significant peak is formed. In addition, there is such an obvious difference that the maximum peak in FIG. 8A, that is, the similarity is 0.18, while the maximum peak in FIG. 8B is 0.019.

As described above, the signal processing apparatus 10 in this embodiment enables significant detection and evaluation of similarity and dissimilarity even for signals in which a significant difference cannot be detected by a common correlation method.

As described above, the signal processing apparatus 10 detects the similar regions by selecting only sufficiently close values, for example, time difference $t_m$ and expansion factor $a_m$ which are obtained when the time difference "t" and the expansion factor "a" of each smaller region are in peak.

Figure 9:
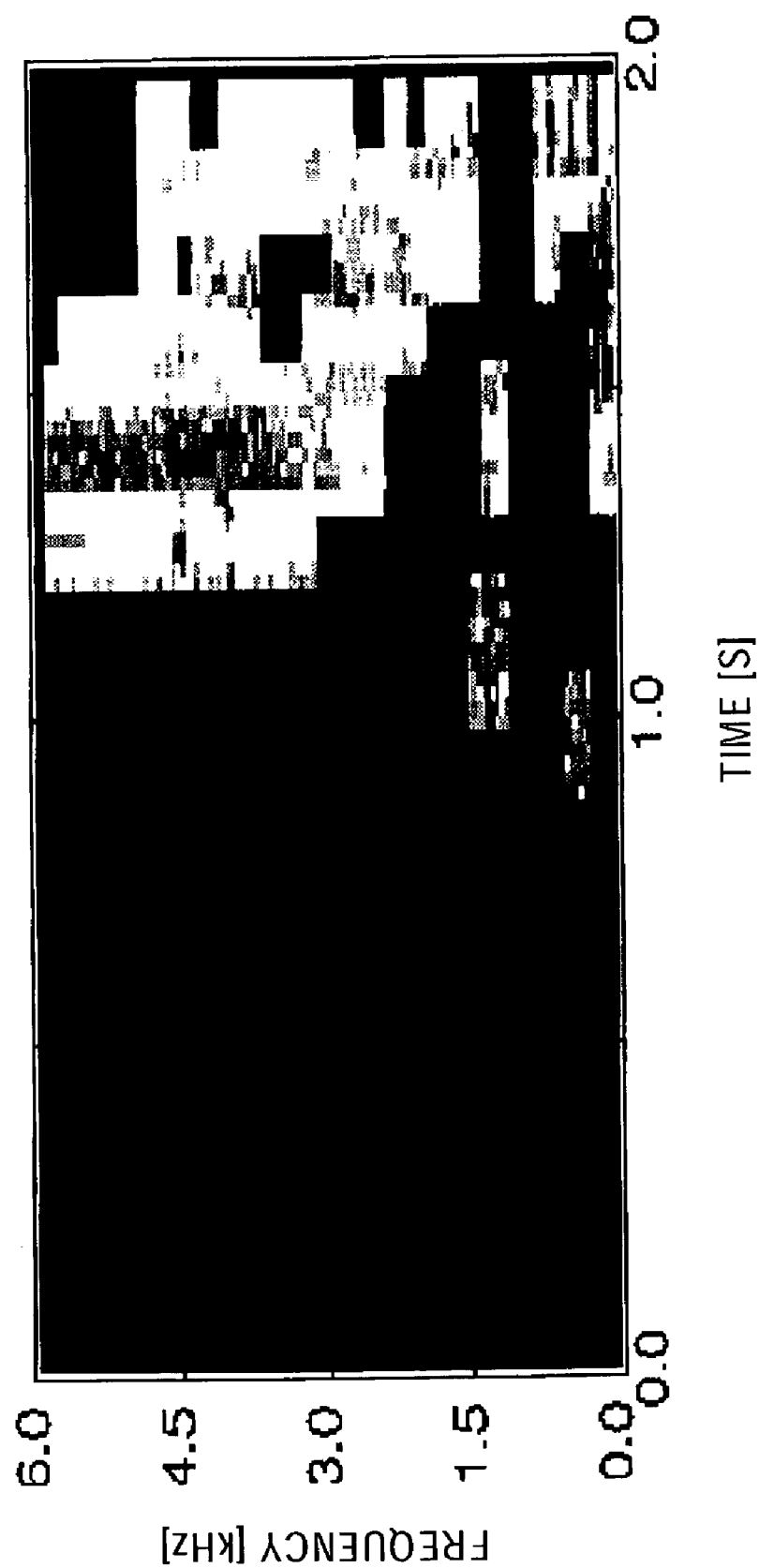
FIG. 9 is a graph showing that regions of signal A which are similar to those of signal B are detected.

The result of detecting regions of signal A which are identical to those of signal B is shown in FIG. 9. In FIG. 9, the portions indicated by spectra are the regions determined to be similar, and the portions indicated in black are regions determined not to be similar. From comparison with FIG. 1, it is confirmed that regions having similar components are detected and it is confirmed that regions constituted by dissimilar components are excluded.

In the above description, similarity "s", time difference "t", and expansion factor "a" in one position corresponding to the maximum correlation in each smaller region with the second signal are acquired and used for voting. However, the present invention is not limited thereto. Similarities "s", time differences "t", and expansion factors "a" at a plurality of positions corresponding to high correlations may be acquired and used for voting.

In the above description, only the maximum similarity $s_m$ in the peak of the voting space is compared with threshold value $S_{thsd}$, and when it is greater than threshold value $s_{thsd}$, a smaller region which votes the peak is reversely found. However, the present invention is not limited thereto. For all the peaks greater than threshold value $S_{thsd}$, smaller regions which vote the peaks may be found. This makes it possible, when the second signal includes a plurality of regions similar to those in the first signal, to extract all the regions.

Figure 10:
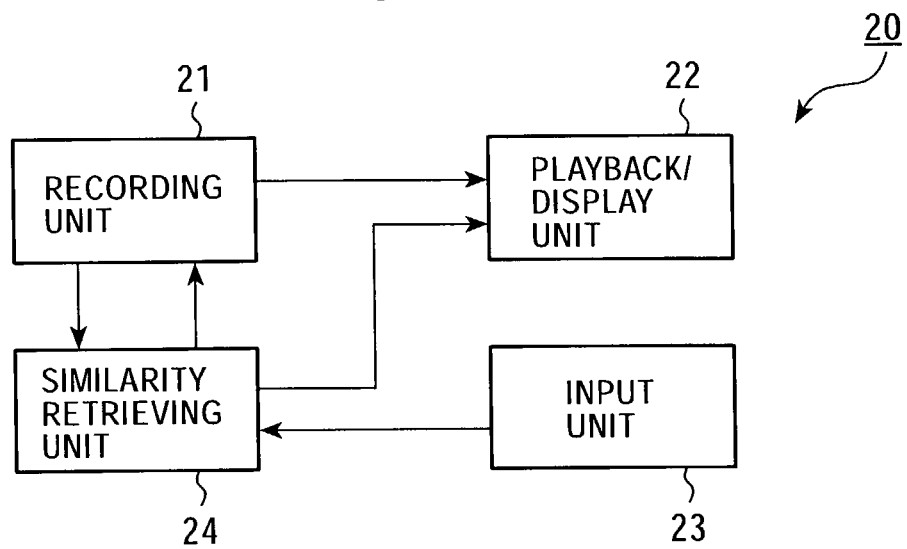
FIG. 10 is a block diagram briefly showing the structure of an audio/video retrieving apparatus to which the signal processing apparatus in FIG. 5 is applied.

The above-described signal processing apparatus 10 can be used for an audio/video retrieving apparatus 20 as shown in FIG. 10. The audio/video retrieving apparatus 20 retrieves a similar scene from a recorded audio-video signal, an audio-video signal obtained through a network, or a broadcast audio-video signal.

As shown in FIG. 10, the audio/video retrieving apparatus 20 includes a recording unit 21, a playback/display unit 22, an input unit 23, and a similarity retrieving unit 24. The similarity retrieving unit 24 corresponds to the above signal processing apparatus 10.

Figure 11:
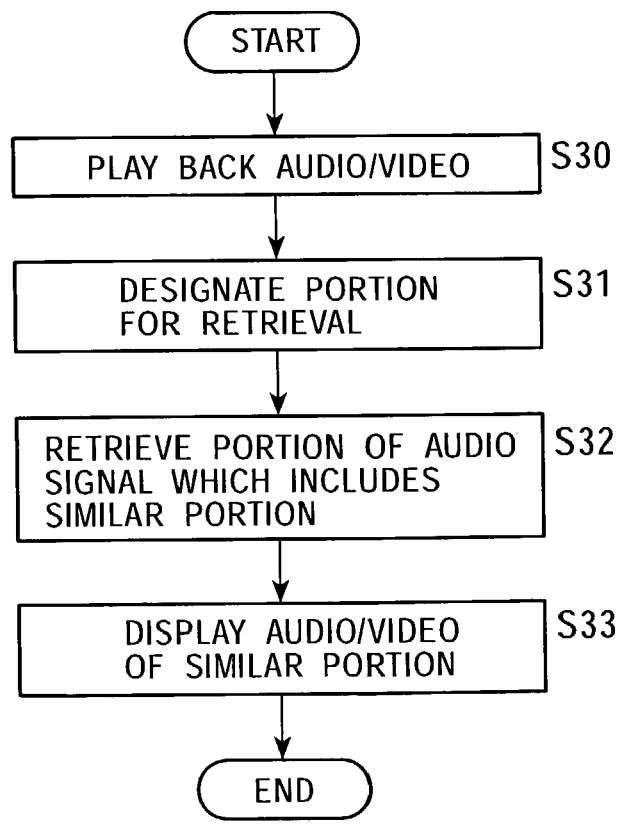
FIG. 11 is a flowchart illustrating the operation of the audio/video retrieving apparatus in FIG. 10.

The operation of the audio/video retrieving apparatus 20 is described with reference to the flowchart shown in FIG. 11. Audio signals are recorded in the recording unit 21. Video, images, and other information may accompany the audio signals.

In step S30, in response to a user's operation, the playback/display unit 22 plays back a signal recorded in the recording unit 21 which is recorded in the recording unit 21 or a signal broadcast in real time.

In step S31, by using the input unit 23, a portion to be retrieved is designated in the played-back signal. The designated portion is posted to the similarity retrieving unit 24.

In step S32, the similarity retrieving unit 24 retrieves, from audio signals for retrieval which are recorded in the recording unit 21, an audio signal including a similar portion.

The audio signals for retrieval are not limited to those prerecorded on magnetic media, etc., but may be signals broadcast in real time or signals that can be obtained through a network. In the case of the signals broadcast in real time, reception of an audio signal including a similar portion is awaited.

When the similar portion is found, in step S33, it is displayed on the playback/display unit 22 and the process ends.

In the above case, a portion to be retrieved is designated from a played-back audio signal by the user. However, the present invention is not limited thereto. For example, the user may designate the file name or the like of an audio signal so that an audio signal similar to the audio signal corresponding to the designated file name can be retrieved. Also, in the above case, the user directly designates a portion to be retrieved. However, the present invention is not limited thereto. For example, an interface with another apparatus may be used for designation.

When an audio signal corresponding to a portion of a broadcast commercial is directly designated by the user, strongly related commercials, such as commercials of a single company, include similar audio-signal components. Thus, the audio/video retrieving apparatus 20 can retrieve the related commercial. In addition, when the audio signal designated by the user is used in common in a broadcast program, the broadcast program, which is similar, can be retrieved.

Figure 12:
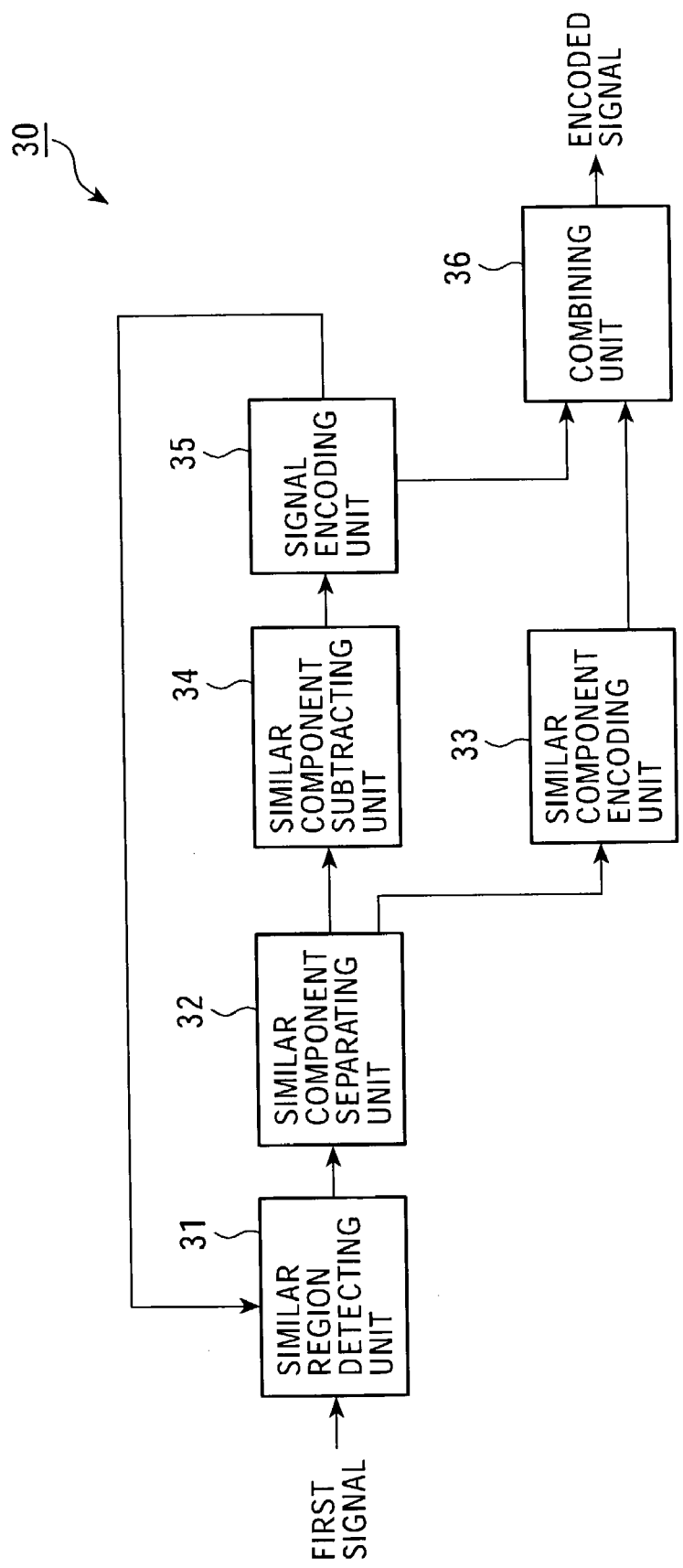
FIG. 12 is a block diagram briefly showing the structure of the audio/video retrieving apparatus in FIG. 10.
Figure 13:
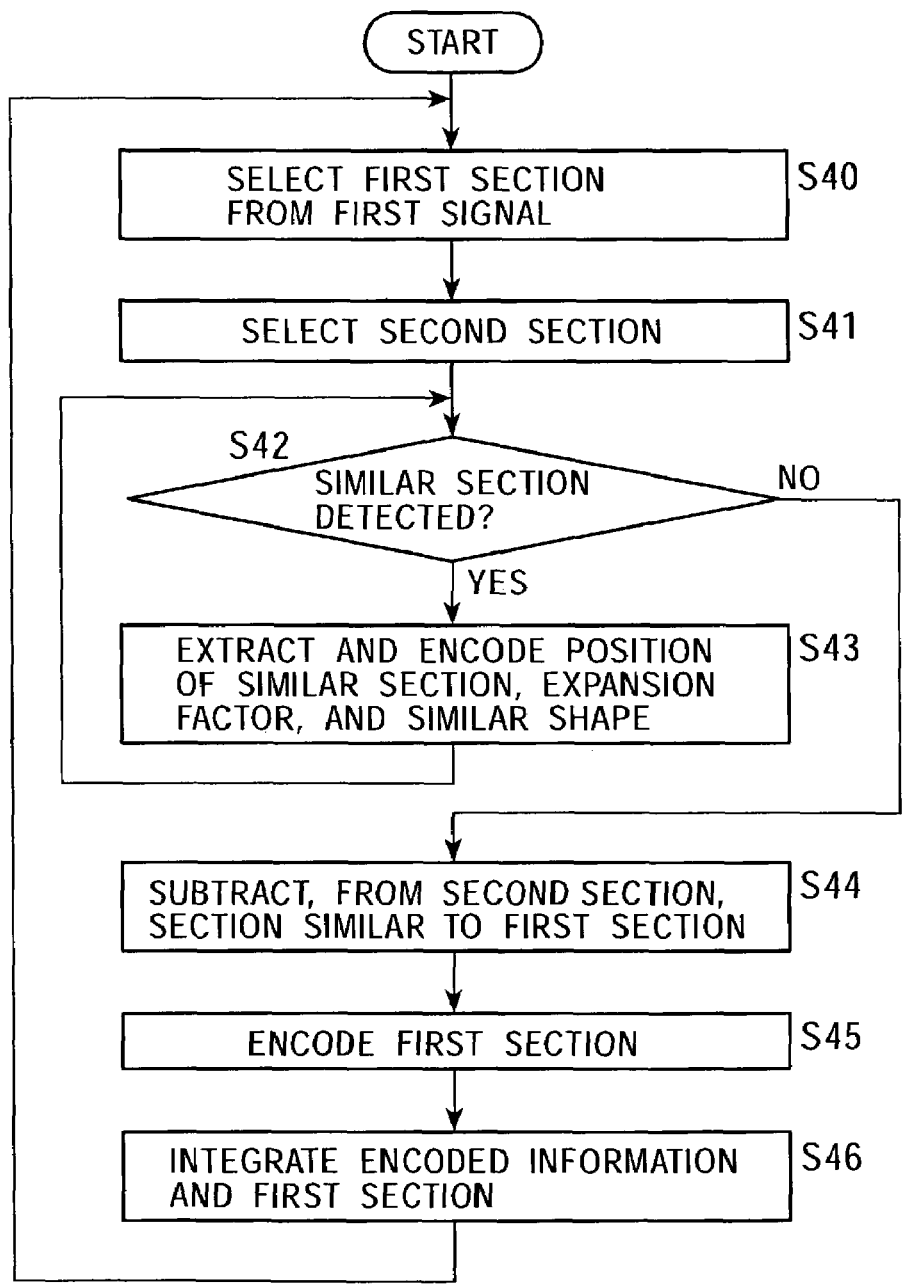
FIG. 13 is a flowchart illustrating the operation of the audio/video retrieving apparatus in FIG. 10.

In addition, the above-described signal processing apparatus 10 is used of an audio-signal encoding apparatus 30 as shown in FIG. 12. In other words, by providing an audio encoding apparatus of the related art with the above-described signal processing apparatus 10, and performing a pre-process which simultaneously encodes similar signals beforehand, encoding efficiency can be increased.

As shown in FIG. 12, the audio-signal encoding apparatus 30 includes a similar region detecting unit 31, a similar component separating unit 32, a similar component encoding unit 33, a similar component subtracting unit 34, a signal encoding unit 35, a combining unit 36. The similar region detecting unit 31 corresponds to the above-described signal processing apparatus 10.

Figure 14A:
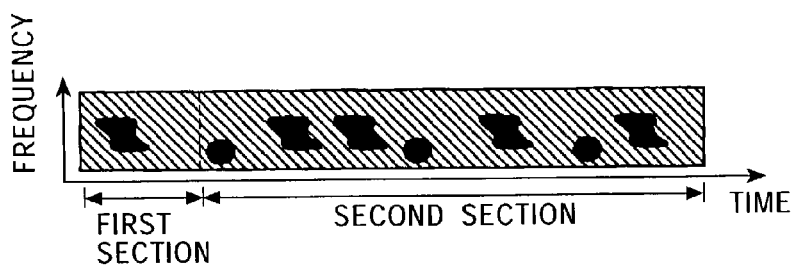

The operation of the audio-signal encoding apparatus 30 having the above-described structure is described with reference to the flowcharts in FIGS. 13 and 14A to 14D. As shown in FIG. 14A, in step S40, the similar region detecting unit 31 selects a first section having an appropriate length from an input first signal. In step S41, the similar region detection unit 31 selects a second section which is different from the first section.

In step S42, the similar region detection unit 31 determines whether the second section includes a portion which is similar to that of the first section. In step S42, when the second section includes the similar portion ("Yes"), the process proceeds to step S43. Conversely, when the second section includes no similar portion, the process proceeds to step S44.

Figure 14B:
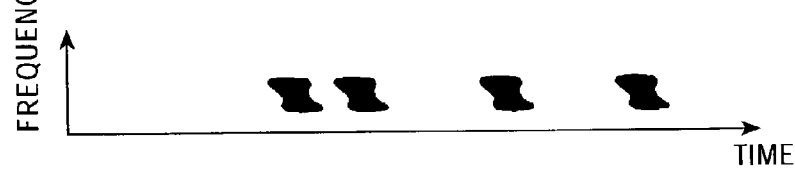

As shown in FIG. 14B, the similar component separating unit 32 extracts the position, expansion factor, and similar shape of the similar portion. The similar component encoding unit 33 encodes the extracted items, and returns to step S42 for further detecting similar portions.

Figure 14C:
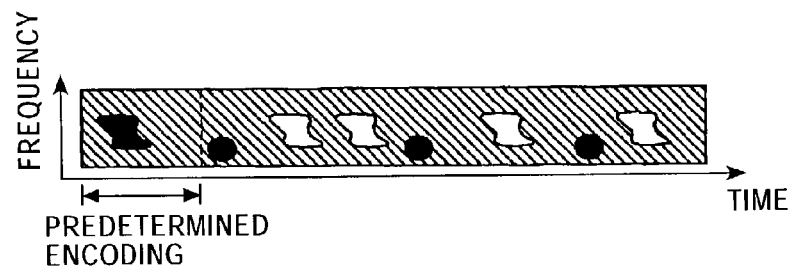

As shown in FIG. 14C, after extraction and encoding for all the similar portions are performed, the similar component subtracting unit 34 subtracts from the second section the portions similar to those of the first section. In the subtraction, the detected expansion factor is used to perform size matching. After the subtraction, dissimilar components remain in the similar portions.

In step S45, the signal encoding unit 35 encodes the signal of the first section by using a common signal encoding method (e.g., sub-band coding, transforming coding, or the like).

Figure 14D:
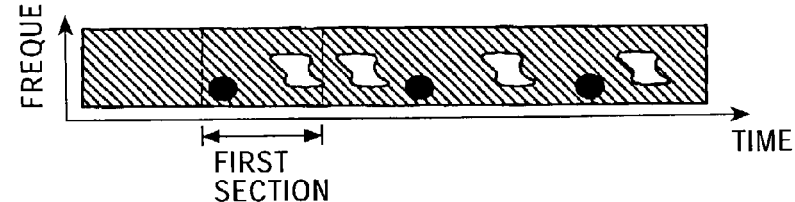

In step S46, the combining unit 36 outputs an encoded signal by combining the information encoded in step S43, such as the similar portion position, and the signal of the first section encoded in step S45. After that, as shown in FIG. 14D, a new first section is determined, and the processing is repeatedly performed.

As described above, according to the audio-video retrieving unit 30, the encoding efficiency in the first section does not differ from that obtained by using a common encoding method because the common encoding method is applied to the first section without being changed. However, in the second and other sections, components similar to those in the signal of the first section are subtracted beforehand, so that they have small amounts of information. Accordingly, for an audio signal in which partially similar patterns repeatedly appear, an increased encoding efficiency can be obtained compared with the case of directly applying the common encoding method.

As described above, according to the signal processing apparatus 10 in this embodiment, by dividing into smaller regions at least one of audio signals which are input and transformed into a time-frequency distribution, finding similarities in the regions with other audio signals transformed into time-frequency distributions, and evaluating the entire similarity after combining the similarities, similarity evaluation and similar portion detection can be performed for a partially similar audio signal which cannot be detected by using a method of the related art.

By providing the audio-video retrieval apparatus with the signal processing apparatus, designation of a desired retrieval position in a played-back audio signal, a signal that is similar to a portion of the audio signal in the retrieval position can be retrieved from the audio signal in a recording medium, or an audio signal acquired through a network.

Also, by providing the audio-video retrieval apparatus with the signal processing apparatus, and performing a separate preprocess for encoding similar signals beforehand, the encoding efficiency of the audio signal increases, thus enabling high sound quality or high compression. In addition, the signal processing method in this embodiment can be applied to similar-signal detection in all types of signal processing fields such as signal detection, audio processing, image processing, radar technology.

Obviously, the present invention is not limited to the above-described embodiment, but may be variously modified without departing the gist thereof.

For example, as described in the embodiment, transformation by expansion and transformation by shifting, which are the most common, are performed, and an expansion factor and a time difference are used as transformation parameters. The embodiment is not limited to the embodiment. The present invention may applied to all types of transformations including linear transformation.

In addition, as described in the embodiment, a technique in which quadratic error energy as the most common similarity-evaluating amount is minimized, that is, a correlative method, is used. However, the present invention is not limited thereto, but may be applied to another type of similarity-evaluating amount.

What is claimed is:

1. A signal processing method comprising:
    transforming a plurality of separate and distinct audio signals into a plurality of time-frequency distributions wherein each of the separate and distinct audio signals is comprised of data from a data set comprising audio data from a different source of stored data;
    dividing at least one time-frequency distribution into a plurality of smaller regions and selecting at least one of the smaller regions for comparison with smaller regions of a plurality of time-frequency distributions corresponding to another one of the data sets for the plurality of audio signals;
    calculating similarity values for the selected smaller region based upon the comparisons with smaller regions of the plurality of time-frequency distributions corresponding to the another one of the data sets; and
    determining whether similarities between the distribution containing the selected smaller region and the another separate distribution exist, wherein the smaller regions are comprised of data from a plurality of separate frequency bands taken from different temporal portions of the data; and further wherein the calculation of similarity values is based on comparisons that are made when only time difference is changed in a single frequency band.

2. A signal processing method according to claim 1, further comprising detecting regions of similarity to the distributions.

3. A signal processing method according to claim 2, further comprising detecting a smaller region having transformation parameters being almost equal to values of transformation parameters at a maximum of a totaled result and identifying values of the transformation parameters;
    wherein the total result is calculated by totaling the similarity values.

4. A signal processing method according to claim 1, further comprising performing a transformation of the smaller regions wherein the transformation is a transformation by expansion and/or a transformation by shifting.

5. A signal processing method according to claim 4, wherein transformation parameters are determined by using a correlative method.

6. A signal processing method according to claim 5, wherein the transformation parameters include at least one of an expansion factor and a time difference which are obtained when the correlation of the selected small region and the smaller regions of the another one of the data sets is at a maximum.

7. A signal processing method according to claim 1, wherein, the similarity values are totaled using transformation parameters as axes.

8. A signal processing method according to claim 1, wherein the similarity values are proportional to the similarities among the time-frequency distributions.

9. A signal processing method according to claim 8, wherein correlations among the distributions, or squares of the correlations, are used as the similarities among the time-frequency distributions.

10. A signal processing method comprising:
    playing back an audio signal recorded in a recording means;
    transforming only a designated portion of the played-back audio signal into a time-frequency distribution;
    dividing the time-frequency distribution into a plurality of smaller regions and selecting at least one of the smaller regions for comparison with smaller regions of a plurality of time-frequency distributions corresponding to a separately stored audio signal;
    calculating similarity values for the selected smaller region with respect to the plurality of time-frequency distributions corresponding to of the other distribution; and
    determining whether similarities between the played back audio and the separately stored audio exist, wherein the smaller regions are comprised of data from a plurality of separate frequency bands taken from different temporal portions of the data; and further wherein the calculation of similarity values is based on comparisons that are made when only time difference is changed in a single frequency band.

11. A signal processing method according to claim 10, wherein said designated portion of the played-back audio is acquired through a network or from a broadcasting signal.

12. A signal processing method according to claim 11, wherein said designated portion is one of an audio part of the broadcasting signal which corresponds to a commercial or an audio signal which is used in common with similar broadcasting programs.

13. A signal processing method comprising:
transforming a plurality of separate and distinct audio signals into a plurality of time-frequency distributions, wherein each of the separate and distinct audio signals is comprised of data from a data set comprising audio data from a different source of stored data;
dividing at least one time-frequency distribution into a plurality of smaller regions and selecting at least one of the smaller regions for comparison with smaller regions of a plurality of time-frequency distributions corresponding to another one of the plurality of audio signals;
calculating similarity values for the selected smaller region with respect to smaller regions of the plurality of time-frequency distributions corresponding to the another one of the plurality of audio signals;
determining whether similarities between the distributions exist;
detecting additional similar regions within the distributions;
encoding the similar regions detected; and
encoding the dissimilar regions, wherein the smaller regions are comprised of data from a plurality of separate frequency bands taken from different temporal portions of the data; and further wherein the calculation of similarity values is based on comparisons that are made when only time difference is changed in a single frequency band.

14. A signal processing method according to claim 13, further comprising performing a transformation of the smaller regions wherein the transformation is a transformation by expansion and/or a transformation by shifting; and
wherein when the similar regions are encoded, information including locations of the similar regions, expansion factors corresponding to the similar regions, and shapes of the similar regions is also encoded.

15. A signal processing apparatus comprising:
a spectral transformation means for transforming a plurality of separate and distinct audio signals into a plurality of time-frequency distributions, wherein each of the separate and distinct audio signals is comprised of data from a data set comprising audio data from a different source of stored data;
a dividing means for dividing at least one time-frequency distribution into a plurality of smaller regions and selecting at least one of the smaller regions for comparison with smaller regions of a plurality of time-frequency distributions corresponding to another one of the plurality of audio signals;
a similarity value calculating means for calculating similarity values for the selected smaller region with respect to the smaller regions of the plurality of time-frequency distributions corresponding to the another one of the plurality of audio signals; and
a similarity evaluating means for evaluating similarities between the distributions, wherein the smaller regions are comprised of data from a plurality of separate frequency bands taken from different temporal portions of the data; and further wherein the calculation of similarity values is based on comparisons that are made when only time difference is changed in a single frequency band.

16. A signal processing apparatus according to claim 15, further comprising similar-region detecting means for detecting a similar regions common to the distributions.

17. A signal processing apparatus according to claim 16, further comprising detecting a smaller region having transformation parameters being almost equal to values of transformation parameters at a maximum of a totaled result and identifying values of the smaller region's transformation parameters;
wherein the totaled result is calculated by totaling the similarity values.

18. A signal processing apparatus according to claim 15, further comprising performing a transformation of the smaller regions wherein the transformation is a transformation by expansion and/or a transformation by shifting.

19. A signal processing apparatus according to claim 18, wherein transformation parameters are determined by using a correlative method.

20. A signal processing apparatus according to claim 19, wherein the transformation parameters include at least one of an expansion factor and a time difference which are obtained when the correlation of the selected smaller regions and the smaller regions of the another one of the plurality of audio signals is at a maximum.

21. A signal processing apparatus according to claim 15, wherein, the similarity values are totaled using transformation parameters as axes.

22. A signal processing apparatus according to claim 15, wherein the similarity values are proportional to the similarities among the distributions.

23. A signal processing apparatus according to claim 22, wherein correlations among the distributions, or squares of the correlations, are used as the similarities among the distributions.

24. A signal processing apparatus comprising:
a recording means in which a plurality of audio signals are recorded from separate and distinct audio sources, wherein each of the separate and distinct audio signals is comprised of data from a data set comprising audio data form a different source of stored data;
a play-back means for playing back one of the recorded audio signals;
a spectral transformation means for transforming a desired portion of the played-back audio signals into a time-frequency distribution;
a dividing means for dividing the retrieval position distribution into a plurality of smaller regions and selecting at least one smaller region for comparison to smaller regions of a plurality of time-frequency distributions corresponding to another of the plurality of audio signals;
a similarity value calculating means for calculating similarity values between the smaller regions of the retrieval position distribution and the smaller regions of the plurality of time-frequency distributions corresponding to the another audio signal;

a similarity evaluating means for evaluating the similarity of the desired portion and portions of the another audio signal wherein the calculation of similarity values is based on comparisons that are made when only time difference is changed in a single frequency band; and a similar-region detecting means for identifying similar regions between said desired portion of the played-back audio signals and the another audio signal, wherein the smaller regions are comprised of data from a plurality of separate frequency bands taken from different temporal portions of the data.

25. A signal processing apparatus according to claim 24, wherein said played-back audio signal portion is acquired through a network or from a broadcasting signal.

26. A signal processing apparatus according to claim 25, wherein the retrieval position is one of an audio part of the broadcasting signal which corresponds to a commercial or an audio signal which is used in common with similar broadcasting programs.

27. A signal processing apparatus comprising:
a spectral transformation means for transforming a plurality of separate and distinct audio signals into a plurality of time-frequency distributions, wherein each of the separate and distinct audio signals is comprised of data from a data set comprising audio data form a different source of stored data;
a dividing means for dividing at least one time-frequency distribution into a plurality of smaller regions and selecting at least one of the smaller regions for comparison with smaller regions of a plurality of time-frequency distributions corresponding to another one of the plurality of audio signals;
a similarity calculating means for calculating similarity values for the selected smaller region with respect to the smaller regions of the plurality of time-frequency distributions corresponding to the another one of the plurality of audio signals wherein the calculation of similarity values is based on comparisons that are made when only time difference is changed in a single frequency band;
a similarity evaluating means for determining whether similarities between the distribution containing the selected smaller region and the another separate distribution exist;
a similar-region detecting means for detecting similar regions common to the distributions;
a first encoding means for encoding the similar regions detected; and
a second encoding means for encoding the dissimilar regions, wherein the smaller regions are comprised of data from a plurality of separate frequency bands taken from different temporal portions of the data.

28. A signal processing apparatus according to claim 27, further comprising performing a transformation of the smaller regions wherein the transformation is a transformation by expansion and/or a transformation by shifting; and
said first encoding means encodes information including locations of the similar regions, expansion factors corresponding to the similar regions, and shapes of the similar regions.

29. A signal processing program embodied within a computer readable storage medium, the signal processing program comprising:
transforming a plurality of separate and distinct audio signals into a plurality of time-frequency distributions, wherein each of the separate and distinct audio signals is comprised of data from a data set comprising audio data form a different source of stored data;
dividing at least one time-frequency distribution into a plurality of smaller regions and selecting at least one of the smaller regions for comparison with smaller regions of a plurality of time-frequency distributions corresponding to another one of the plurality of audio signals;
calculating similarity values for the selected smaller region with respect to smaller regions of the plurality of time-frequency distributions corresponding to the another one of the plurality of audio signals and further wherein the calculation of similarity values is based on comparisons that are made when only time difference is changed in a single frequency band; and
determining whether similarities between the distribution containing the selected smaller region and the another separate distribution exist, wherein the smaller regions are comprised of data from a plurality of separate frequency bands taken from different temporal portions of the data.

30. A signal processing program according to claim 29, further comprising detecting regions of similarity common to the distributions.

31. A signal processing program according to claim 30, further comprising detecting a smaller region having transformation parameters almost equal to transformation parameters at a maximum of a totaled result and identifying values of the smaller region's transformation parameters;
wherein the totaled result is calculated by totaling the similarity values.

32. A signal processing program according to claim 29, further comprising performing a transformation of the smaller regions wherein the transformation is a transformation by expansion and/or a transformation by shifting.

33. A signal processing program according to claim 32, wherein transformation parameters are determined by using a correlative method.

34. A signal processing program according to claim 33, wherein the transformation parameters include at least one of an expansion factor and a time difference which are obtained when the correlation of the selected smaller regions and the smaller regions of the another separate distribution is at a maximum.

35. A signal processing program according to claim 29, wherein, the similarity values are totaled using transformation parameters as axes.

36. A signal processing program according to claim 29, wherein the similarity values are proportional to the similarities among the distributions.

37. A signal processing program according to claim 36, wherein correlations among the distributions or squares of the correlations are used as the similarities among the distributions.

38. A signal processing program embodied within a computer readable storage medium, the signal processing program comprising:
playing back a portion of an audio signal recorded in a recording means;
transforming the portion of the played-back audio signal into a time-frequency distribution;
dividing the time-frequency distribution into a plurality of smaller regions and selecting at least one of the smaller regions for comparison with smaller regions of a plurality of time-frequency distributions corresponding to a separately stored audio signal;
calculating similarity values for the selected smaller region with respect to smaller regions of the plurality of time-frequency distributions corresponding to the separately stored audio signal and further wherein the calculation of similarity values is based on comparisons that are made when only time difference is changed in a single frequency band; and determining whether similarities between the portion of the played back signal and said separately stored audio signal exist, wherein the smaller regions are comprised of data from a plurality of separate frequency bands taken from different temporal portions of the data.

39. A signal processing program embodied within a computer readable storage medium, the signal processing program comprising:

transforming a plurality of separate and distinct audio signals into a plurality of time-frequency distributions, wherein each of the separate and distinct audio signals is comprised of data from a data set comprising audio data form a different source of stored data;

dividing at least one distribution into a plurality of smaller regions and selecting at least one of the smaller regions for comparison with smaller regions of a plurality of time-frequency distributions corresponding to another one of the plurality of audio signals;

calculating similarity values for the selected smaller region with respect to smaller regions of the plurality of time-frequency distributions corresponding to the another one of the plurality of audio signals and further wherein the calculation of similarity values is based on comparisons that are made when only time difference is changed in a single frequency band;

determining whether similarities between the distribution containing the selected smaller region and the another separate distribution exist;

detecting additional similar regions within the distributions;

encoding the similar regions detected; and encoding the dissimilar regions, wherein the smaller regions are comprised of data from a plurality of separate frequency bands taken from different temporal portions of the data.

40. A signal processing program according to claim 39, further comprising performing a transformation of the smaller regions wherein the transformation is a transformation by expansion and/or a transformation by shifting; and wherein when the similar regions are encoded, information including locations of the similar regions, expansion factors corresponding to the similar regions, and shapes of the similar regions is also encoded.

41. A recording medium controllable by a computer, containing a signal processing program comprising:

playing back a portion of an audio signal recorded in a recording means;

transforming the portion of the played-back audio signal into a time-frequency distribution;

dividing the time-frequency distribution into a plurality of smaller regions and selecting at least one of the smaller regions for comparison with smaller regions of a plurality of time-frequency distributions corresponding to another stored separate and distinct audio signal, wherein each of the separate and distinct audio signals is comprised of data from a data set comprising audio data from a different source of stored data;

determining whether similarities exist between the audio signals exist, wherein the smaller regions are comprised of data from a plurality of separate frequency bands taken from different temporal portions of the data; and further wherein the calculation of similarity values is based on comparisons that are made when only time difference is changed in a single frequency band, wherein said played back portion of the played-back audio signal is acquired through a network or from a broadcasting signal.

42. A recording medium according to claim 41, wherein the played back portion is one of an audio part of the broadcasting signal which corresponds to a commercial or an audio signal which is used in common with similar broadcasting programs.

* * * * *